(12) United States Patent
Chan et al.

(10) Patent No.: US 6,460,404 B1
(45) Date of Patent: Oct. 8, 2002

(54) APPARATUS AND METHOD FOR DETECTING BAD EDGE BEAD REMOVAL IN A SPIN-ON-GLASS COATER TOOL

(75) Inventors: Soon Chye Chan, Johor Bahru (MY); Bak Hong Chia, Singapore (SG); Chun Pheng Tan, Singapore (SG)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 0 days.

(21) Appl. No.: 09/686,280

(22) Filed: Oct. 12, 2000

(51) Int. Cl.[7] ............................................... G01M 3/04
(52) U.S. Cl. ............................................................. 73/40
(58) Field of Search ....................... 73/40, 49.2, 40.5 R

(56) References Cited

U.S. PATENT DOCUMENTS

| | | | |
|---|---|---|---|
| 3,630,804 A | * 12/1971 | Coffman | 156/345 |
| 4,192,729 A | * 3/1980 | Canelleri et al. | 204/272 |
| 5,134,962 A | * 8/1992 | Amada et al. | 118/688 |
| 5,154,776 A | * 10/1992 | Bloch | 134/22.1 |
| 5,417,346 A | * 5/1995 | Ferri, Jr. et al. | 222/61 |
| 5,522,957 A | * 6/1996 | Weling et al. | 156/626.1 |
| 5,607,002 A | * 3/1997 | Siegele et al. | 141/198 |
| 5,620,659 A | * 4/1997 | Revesz | 422/90 |
| 5,711,876 A | * 1/1998 | Lee | 210/436 |
| 5,792,237 A | * 8/1998 | Hung et al. | 95/24 |
| 5,834,631 A | * 11/1998 | Yamaguti et al. | 73/40 |
| 5,855,727 A | * 1/1999 | Martin et al. | 156/345 |
| 6,116,260 A | * 9/2000 | Nakagawa et al. | 137/14 |
| 6,168,048 B1 | * 1/2001 | Xu et al. | 222/1 |
| 6,245,148 B1 | * 6/2001 | Liang et al. | 118/683 |

\* cited by examiner

*Primary Examiner*—Hezron Williams
*Assistant Examiner*—Charles D. Garber
(74) *Attorney, Agent, or Firm*—George O. Saile; Rosemary L. S. Pike; William J. Stoffel

(57) ABSTRACT

A solvent delivery system for an edge bead removal tool (EBR) that detects $N_2$ leaks in a solvent pressure tank that surrounds a solvent bottle. A solvent bottle is surrounded by a pressure tank. The solvent bottle contains the solvent used in the EBR tool. A $N_2$ gas supply is connected to the pressure tank and pressurizes the inside of the pressure tank with $N_2$ gas. A pressure sensor is connected to the pressure tank. The pressure sensor senses the $N_2$ pressure inside of the pressure tank. The system board notifies an operator when the pressure sensor detects an unsatisfactory $N_2$ pressure condition inside the pressure tank. The solvent bottle contains a solvent. A buffer solvent is in the solvent buffer tank. A solvent level sensor is on the solvent buffer tank. The solvent level sensor is connected to the interlock circuit. Wherein the system board notifies an operator when the solvent level sensor detects an unsatisfactory buffer solvent level in the solvent tank. A buffer solvent delivery line is connected from the solvent buffer tank to a nozzle over a substrate. The interlock circuit is connected to the system user board by a circuit to board line.

16 Claims, 2 Drawing Sheets

APPARATUS AND METHOD FOR DETECTING BAD EDGE BEAD REMOVAL IN A SPIN-ON-GLASS COATER TOOL

BACKGROUND OF INVENTION

1) Field of the Invention

This invention relates generally to fabrication of semiconductor devices and more particularly to the removal of spin-on-glass (SOG) from wafer using an Edge Bead removal tool and more particularly to a pressure detecting system for monitoring the $N_2$ pressure in a tank surrounding a solvent bottle.

2) Description of the Prior Art

Edge bead removal (EBR) is used to remove the spin-on-glass (SOG) at the ring side of the wafer edge, thus creating a cleaned ring. EBR may be necessary in process flows that incorporate post SOG processes when mechanical systems clamp both the front and backside of the wafer edge. Thick SOG on the edge is a potential source of particles where claimed. The solvent used for EBR is EL-100 (e.g., solvent is ethyl Lactate) made by Advanced chemical systems International, Inc (ACSI).

The inventors have found problems with current EBR tools. In particular, the EBR tools do not have adequate sensors and alarms to detect problems with the solvent delivery systems.

The importance of overcoming the various deficiencies noted above is evidenced by the extensive technological development directed to the subject, as documented by the relevant patent and technical literature. The closest and apparently more relevant technical developments in the patent literature can be gleaned by considering U.S. Pat. No. 6,024,249 (On) that shows a optical sensor for detecting bubbles in a SOG line.

U.S. Pat. No. 5,089,305 (Ushijima et al.) (assigned to TEL) shows a SOG/photoresist tool.

U.S. Pat. No. 6,010,570 (Motada et al.), U.S. Pat. No. 5,688,322 (Motad et al.) and U.S. Pat. No. 5,925,410 (Akram) show other SOG tools and processes.

SUMMARY OF THE INVENTION

It is an object of the present invention to provide a system for detecting problems with solvent delivery systems for edge bead removal (EBR) tools.

It is an object of the present invention to provide a system to monitor the gas (e.g., $N_2$) pressure in a pressure tank that surrounds a solvent bottle for an EBR tool.

It is an object of the present invention to provide a system to monitor the gas (e.g., $N_2$) pressure in a pressure tank that surrounds a solvent bottle for an EBR tool in a TEL MK-8 SOG machine.

To accomplish the above objectives, the present invention provides a system to monitor the gas (e.g., $N_2$) pressure in a pressure tank that surrounds a solvent bottle for an EBR tool.

A preferred embodiment of the present invention will be described. The present invention provides a solvent delivery system for an edge bead removal tool (EBR). The invention is a system for detecting $N_2$ leaks in a solvent pressure tank that surrounds a solvent bottle in an Edge Bead removal tool in a spin-on-glass coater. The invention comprises the following. A solvent bottle (e.g., EBR EL-100 bottle) is surrounded by a pressure tank (e.g., canister tank). The solvent bottle contains the solvent used in the EBR tool. The pressure tank is preferably comprised of a top, a bottom and an o-ring; wherein the pressure sensor detects when the o-ring is defective. A $N_2$ gas supply is connected to the pressure tank and pressurizes the inside of the pressure tank with $N_2$ gas. A pressure sensor is connected to the pressure tank. Wherein the pressure sensor senses the $N_2$ pressure inside of the pressure tank. The pressure sensor is connected to an interlock circuit preferably by a line. The interlock circuit is connected to a system board by a line (interlock-board line). The system board notifies an operator when the pressure sensor detects an unsatisfactory $N_2$ pressure condition inside the pressure tank. An unsatisfactory $N_2$ pressure condition may be a low pressure below a low pressure limit or a high pressure above a high pressure limit. Alternatively, unsatisfactory $N_2$ pressure condition may be a rate of pressure loss that is greater than a rate or pressure loss limit. The solvent bottle contains a solvent. A solvent delivery line connects the solvent bottle to a solvent buffer tank. A buffer solvent is in the solvent buffer tank. A solvent level sensor is on the solvent buffer tank. The solvent level sensor is connected to the interlock circuit. Wherein the system board notifies an operator when the solvent level sensor detects an unsatisfactory buffer solvent level in the solvent tank. A buffer solvent delivery line is connected from the solvent buffer tank to a nozzle over a substrate. The buffer tank preferably further comprises a drain valve. The interlock circuit is connected to the system user board by a circuit to board line.

Additional objects and advantages of the invention will be set forth in the description that follows, and in part will be obvious from the description, or may be learned by practice of the invention. The objects and advantages of the invention may be realized and obtained by means of instrumentalities and combinations particularly pointed out in the append claims.

BRIEF DESCRIPTION OF THE DRAWINGS

The features and advantages of a semiconductor device according to the present invention and further details of a process of fabricating such a semiconductor device in accordance with the present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENTS

A. Problem the Invention Solves

The inventors have found that the Edge bead removal (EBR) tool was not operating properly and this lead to the scrapping of many product wafer. The problem was that the solvent was not being delivered to the EBR tool properly. A problem found by the inventors was that $N_2$ leaks were occurring in the pressure tank that surrounds the solvent bottle. This invention solves the problem of improper solvent delivery by implementing a $N_2$ pressure sensor 64 on the pressure tank around the solvent bottle and a buffer solvent level sensor 78. A critical part of the invention is the discovery of the problem.

B. Overview of the Invention

Figure 1:
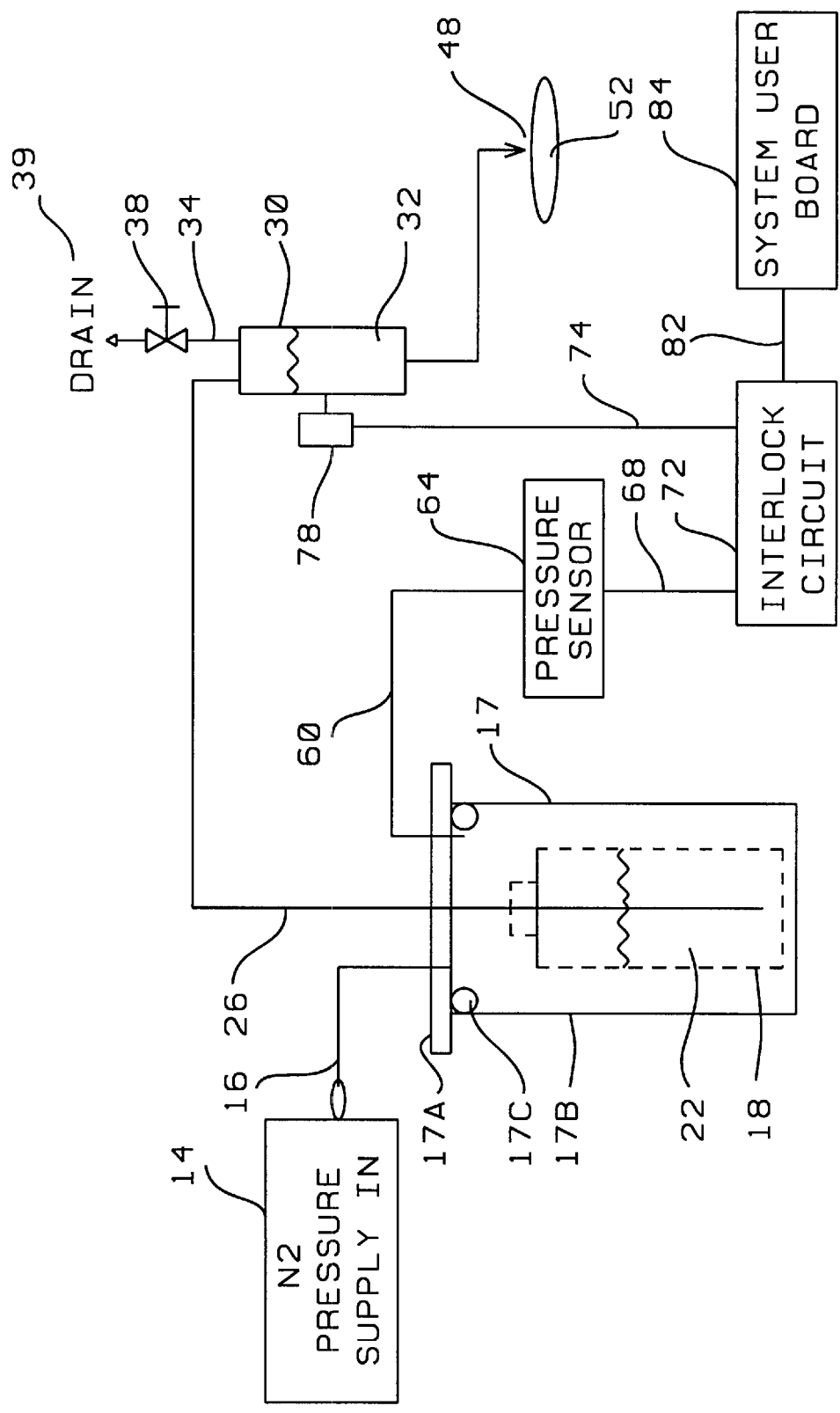
FIG. 1 is a schematic view of a preferred embodiment of the present invention for system to monitor the gas (e.g., $N_2$) pressure in a pressure tank that surrounds a solvent bottle for an EBR/SOG tool.
Figure 2:
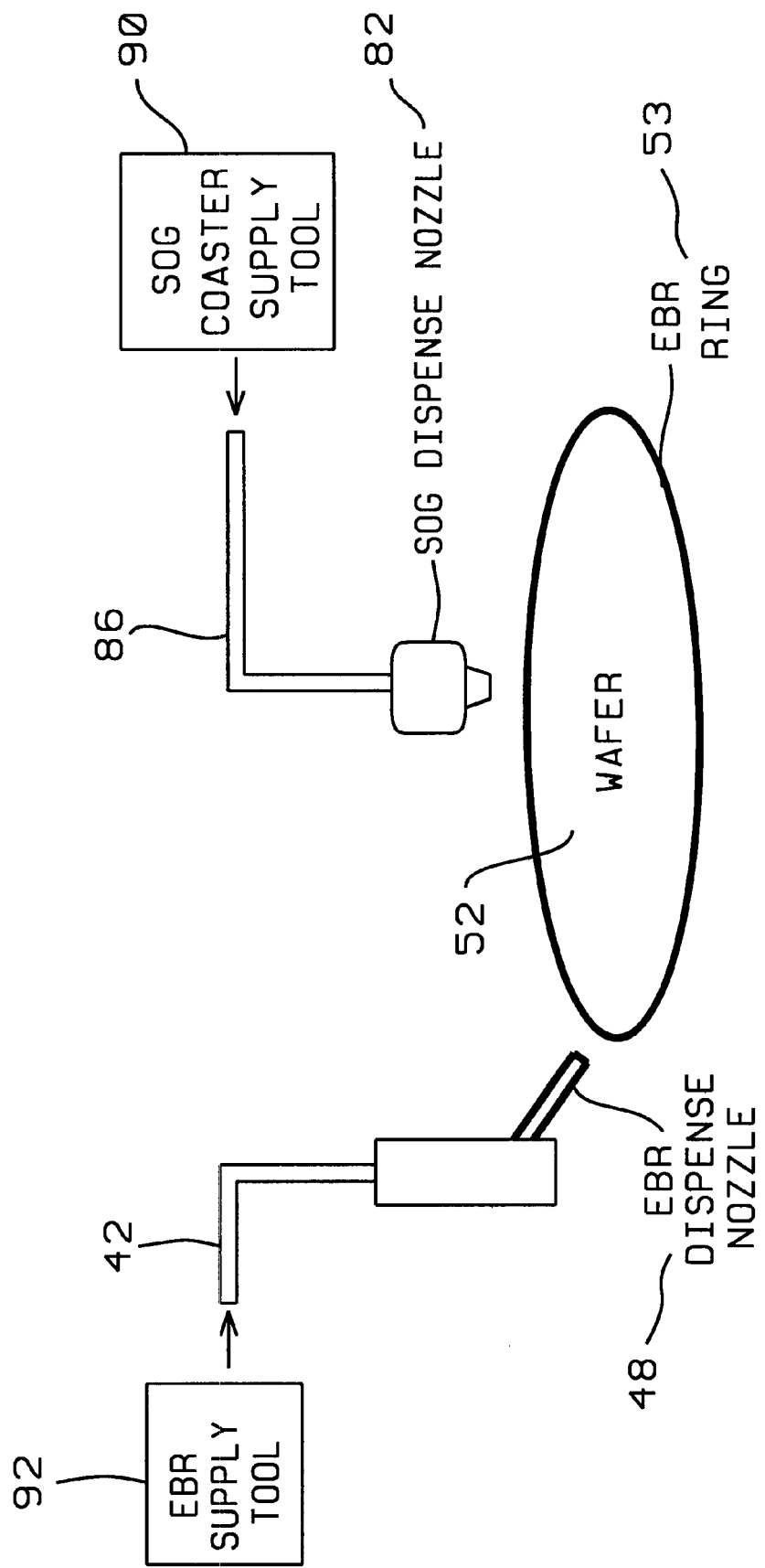
FIG. 2 is a schematic view of a preferred embodiment of the present invention showing the EBR nozzle and SOG nozzle over a wafer that has a SOG ring 53.

The present invention will be described in detail with reference to the accompanying drawings. As shown in FIG. 1, The present invention provides a solvent delivery system for an edge bead removal tool (EBR). The invention is a system for detecting $N_2$ leaks in a solvent pressure tank that surrounds a solvent bottle in an edge Bead removal tool in a spin-on-glass coater. As shown in FIG. 2, the edge bead 53 is SOG to piles up on around the edge of the wafer 53. The EBR tool sprays solvent on the bead 53 to remove the bead.

The invention's $N_2$ monitoring and solvent system is most preferably embodied in a SOG coater/EBR tool manufactured by TEL and model TEL Mk-8.

The invention comprises the following. A solvent bottle (e.g., EBR EL-100 bottle) 18 is surrounded by a pressure tank 17 (e.g., canister tank). The pressure tank 17 is around the solvent bottle and $N_2$ pressurizes the solvent 22 in the bottle 22 drive the solvent through the tubes 26 to the buffer tank 30. The solvent bottle is changed when a solvent/EBR level sensor detects a low level.

In slightly more detail, a preferred embodiment of the present invention will be described. A solvent bottle (e.g., EBR EL-100 bottle) 18 is surrounded by a pressure tank 17 (e.g., canister tank). The solvent bottle contains the solvent used in the EBR tool. The pressure tank 17 is preferably comprised of a top 17A, a bottom 17B and an o-ring 17C; wherein the pressure sensor 64 detects when the o-ring 17C is defective. A $N_2$ gas supply 14 is connected to the pressure tank 17 and pressurizes the inside of the pressure tank 17 with $N_2$ gas. A pressure sensor 64 is connected to the pressure tank 17. Wherein the pressure sensor 64 senses the $N_2$ pressure inside of the pressure tank 17. The pressure sensor 64 is connected to a interlock circuit 72 preferably by a line 68. The interlock circuit 72 is connected to a system board by a line 82 (interlock-board line). The system board notifies an operator when the pressure sensor detects an unsatisfactory $N_2$ pressure condition inside the pressure tank 17. An unsatisfactory $N_2$ pressure condition may be a low pressure below a low pressure limit or a high pressure above a high pressure limit. Alternatively, unsatisfactory $N_2$ pressure condition may be a rate of pressure loss that is greater than a rate or pressure loss limit. The solvent bottle contains a solvent 22. A solvent delivery line 26 connects the solvent bottle to a solvent buffer tank 30. A buffer solvent 32 is in the solvent buffer tank 30. A solvent level sensor 78 is on the solvent buffer tank 30. The solvent level sensor 78 is connected to the interlock circuit 72. Wherein the system board notifies an operator when the solvent level sensor 78 detects an unsatisfactory buffer solvent 32 level in the solvent tank 30. A buffer solvent delivery line 42 is connected from the solvent buffer tank 30 to a nozzle 48 over a substrate 52. The buffer tank 30 preferably further comprises a drain valve 38. The interlock circuit is connected to the system user board 84 by a circuit to board line 82.

The solvent bottle is preferably a polyethylene bottle. The solvent bottle is preferably a polyethylene bottle manufactured by Advanced Chemical Systems International, Inc (ASCI, Inc) model EL-100 bottle.

C. Pressure Tank 17

The pressure tank 17 is preferably comprised of a top 17A, a bottom 17B and an o-ring 17C; wherein the pressure sensor 64 detects when the o-ring 17C is defective. The pressure tank can be a stainless steel canister tank/ cyclohexanone canister tank manufactured by TEL (Tokyo Electron Limited) model number NIL.

D. Solvent

The solvent is preferably used to remove spin-on-glass (SOG) from wafers. The SOG Is preferably SOG P112A by Honeywell and SOG 214 by Honeywell. SOG P112A contains Phosphosilicates. SOG 214 contains Siloxane.

E. $N_2$ Pressure

A $N_2$ gas supply 14 is connected to the pressure tank 17 and pressurizes the inside of the pressure tank 17 with $N_2$ gas, and pressurizes the inside of the bottle 18. $N_2$ gas supply is preferably a gas system for the manufacturing facility or a gas tank.

F. Pressure Sensor

An important element of the invention is the pressure sensor 64. Conventional EBR tanks do not have pressure sensors that are connected to a process monitoring system. The pressure sensor 64 is connected to the pressure tank 17. The pressure sensor 64 is connected to the pressure tank 17 by pressure tank to sensor line 60. The pressure sensor 64 senses the $N_2$ pressure inside of the pressure tank 17. The pressure sensor can be any digital pressure sensor and is preferably a digital pressure sensor such as a model DP2-22, manufactured by SUNX Limited.

The pressure sensor 64 is connected to a interlock circuit 72 preferably by a line 68. The pressure sensor 64 is connected to the interlock circuit 72 by a sensor to interlock line 68.

G. Interlock Circuit

The interlock circuit 72 is connected to a system board by a line 82 (interlock-board line). The system board notifies an operator when the pressure sensor detects an unsatisfactory $N_2$ pressure condition inside the pressure tank 17. An unsatisfactory $N_2$ pressure condition may be a low pressure below a low pressure limit or a high pressure above a high pressure limit. Alternatively, unsatisfactory $N_2$ pressure condition may be a rate of pressure loss that is greater than a rate or pressure loss limit. Other unsatisfactory conditions may also be monitored.

The interlock circuit comprises a circuit board with the 555 timer, optical couple and logic gate.

H. Bottle and Buffer Bottle

The solvent bottle contains a solvent 22. The solvent bottle contains the solvent used in the EBR tool. The solvent is preferably Isopropyl Alcohol (IPA) or a EL-100 that is comprised of the following chemicals: EL-100 (Ethyl Lactate) and IPA.

A solvent delivery line 26 connects the solvent bottle to a solvent buffer tank 30.

A buffer solvent 32 (same as solvent 22) is in the solvent buffer tank 30. A solvent level sensor 78 is on the solvent buffer tank 30.

The solvent level sensor 78 is connected to the interlock circuit 72. Wherein the system board notifies an operator when the solvent level sensor 78 detects an unsatisfactory buffer solvent 32 level in the solvent tank 30. A buffer solvent delivery line 42 is connected from the solvent buffer tank 30 to a nozzle 48 over a substrate 52.

The buffer tank 30 preferably further comprises a drain valve 38.

I. System User Board 84

The interlock circuit is connected to the system user board 84 by a circuit to board line 82.

J. $N_2$ Leaks

The pressure sensor 64 detects when the $N_2$ gas supply 14 is defective.

The pressure sensor 64 also detects when the solvent bottle 18 is improperly installed in the pressure tank. A defective O-ring or an incorrectly positioned O-ring can cause a $N_2$ Leak. A low $N_2$ pressure will lower or stop the solvent flow to the buffer tank 30 which can reduce or stop the solvent flow to the wafer through the nozzle 48.

K. How the System Works

When a $N_2$ leak is detected by the pressure sensor, the pressure sensor sends a signal to the interlock circuit 72 that sends a signal to the system user board. The system user board alerts the operator to the problem so the tool can be shut down. Alternatively, the system uses board stops the tool so that wafers are not scrapped.

L. Interlock Operation

An error signal will be sent to the machine by the interlock circuit if ether (I) the pressure inside the EBR canister tank fluctuates or is out of specification (90 to 95 Kpa) or (ii) if a low level of EBR E100 solvent balance is detected in the solvent buffer tank.

The SOG/EBR machine (e.g., TEL MK-8 SOG machine monitor screen) will display a "EF rinse empty" alarm after receiving this error signal from the interlock circuit.

M. EBRISOG Nozzles in Same Tool

FIG. 2 is a schematic view of a preferred embodiment of the present invention showing the EBR nozzle and SOG nozzle over a wafer that has a SOG ring 53. The EBR tool 92 supplies solvent to a wafer 52 through the EBR Nozzle 48. A SOG coater supply tool 90 supplies SOG to the wafer 52 through a SOG dispense Nozzle 82. The EBR nozzle sprays solvent on the edge of the wafer 52 to remove the bead 53 from the edge of the wafer 52.

Within the present invention, the substrate 52 may be a substrate employed within a microelectronics fabrication selected from the group including but not limited to integrated circuit microelectronics fabrications, solar cell microelectronics fabrications, ceramic substrate microelectronics fabrications and flat panel display microelectronics fabrications. Although not specifically illustrated within the schematic cross-sectional diagram of FIG. 1, the substrate 52 may be the substrate itself employed within the microelectronics fabrication, or in the alternative, the substrate may be the substrate employed within tile microelectronics fabrication, where the substrate has formed thereupon or thereover any of several additional microelectronics layers as are conventionally employed within the microelectronics fabrication, Such additional microelectronics layers may include, but are not limited to, microelectronics conductor layers, microelectronics semiconductor layers and microelectronics dielectric layers.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

While the invention has been particularly shown and described with reference to the preferred embodiments thereof, it will be understood by those skilled in the art that various changes in form and details may be made without departing from the spirit and scope of the invention. It is intended to cover various modifications and similar arrangements and procedures, and the scope of the appended claims therefore should be accorded the broadest interpretation so as to encompass all such modifications and similar arrangements and procedures.

What is claimed is:

1. A system for detecting $N_2$ leaks in a solvent pressure tank that surrounds a solvent bottle in a Edge Bead removal tool in a spin-on-glass coater; comprising:

a) a solvent bottle surrounded by a pressure tank; a $N_2$ gas-supply connected to said pressure tank and pressurizes the inside of said pressure tank and said solvent bottle with $N_2$ gas;

b) a pressure sensor connected to said pressure tank; wherein said pressure sensor senses the $N_2$ pressure inside of said pressure tank; said pressure sensor detects when said solvent bottle is improperly installed in said pressure tank; said pressure sensor is connected to a interlock circuit; said interlock circuit is connected to a system board; wherein said system board notifies an operator when said pressure sensor detects an unsatisfactory $N_2$ pressure inside said pressure tank and said solvent bottle;

c) said solvent bottle contains a solvent; a solvent delivery line connects said solvent bottle to a solvent buffer tank; a buffer solvent in said solvent buffer tank; and d) a buffet solvent delivery line connected from said solvent buffer tank to a nozzle over a substrate.

2. The system of claim 1 wherein a solvent level sensor on said solvent buffer tank; said solvent level sensor connected to said interlock circuit; said interlock circuit is connected to said system user board by a circuit to board line; wherein said system board notifies an operator when said solvent level sensor detects an unsatisfactory buffer solvent level in said solvent tank.

3. The system of claim 1 wherein said solvent is ethyl lactate.

4. The system of claim 1 wherein said pressure tank is comprised of a top, a bottom and an o-ring; wherein said pressure sensor detects when said o-ring is defective.

5. The system of claim 1 wherein said pressure sensor detects when said $N_2$ gas supply is defective.

6. The system of claim 1 wherein said buffer tank further comprises a drain valve.

7. The system of claim 1 wherein said pressure sensor is connected to said pressure tank by pressure tank to sensor line.

8. The system of claim 1 wherein said pressure sensor is connected to said interlock circuit by a sensor to interlock line.

9. The system of claim 1 wherein said interlock circuit is connected to said system user board by a circuit to board line.

10. The system of claim 1 wherein the substrate is selected from the group consisting of:

microelectronics conductor materials;
   microelectronics semiconductor materials; and
   microelectronics dielectric materials.

11. The system of claim 1 wherein the substrate is used in microelectronics fabrication; microelectronics fabrication is selected from the group consisting of:

integrated circuit microelectronics fabrications;
   charge coupled device microelectronics fabrications;
   solar cell microelectronics fabrications;
   ceramic substrate microelectronics fabrications; and
   flat panel display microelectronics fabrications.

12. The system of claim 1 which further comprises: said system detects $N_2$ leaks in said pressure tank that surrounds said solvent bottle in a Edge Bead removal tool in a spin-on-glass coater.

13. The system of claim 1 wherein said system is embodied in a Edge Bead removal tool in a spin-on-glass coater.

14. A system for detecting $N_2$ leaks in a solvent pressure tank that surrounds a solvent. bottle in a Edge Bead removal tool in a spin-on-glass coater; comprising:
- a) a solvent bottle surrounded by a pressure tank; a $N_2$ gas supply connected to said pressure tank and pressurizes the inside of said pressure tank with $N_2$ gas;
  - (1) said solvent bottle contains a solvent comprised of ethyl lactate;
  - (2) said pressure tank is comprised of a top, a bottom and an o-ring;
- b) a pressure sensor connected to said pressure tank; wherein said pressure sensor senses the $N_2$ pressure inside of said pressure tank; said pressure sensor is connected to a interlock circuit; said interlock circuit is connected to a system board; wherein said system board notifies an operator when said press sensor detects an unsatisfactory $N_2$ pressure inside said pressure tank; said pressure sensor is a digital pressure sensor;
  - (1) said pressure sensor is connected to said pressure tank by pressure tank to sensor line;
  - (2) said pressure sensor is connected to said interlock circuit by a sensor to interlock line;
- c) said solvent bottle contains a solvent; a solvent delivery line connects said solvent bottle to a solvent buffer tank; said buffer solvent in said solvent buffer tank;
  - (1) said buffer tank further comprises a drain valve;
- d) a solvent level sensor on said solvent buffer tank; said solvent level sensor connected to said interlock circuit; said interlock circuit is connected to said system user board by a circuit to board line; wherein said system board notifies an operator when said solvent level sensor detects an unsatisfactory buffer solvent level in said solvent tank;
- e) a buffer solvent delivery line connected from said solvent buffer tank to a nozzle over a substrate;

wherein said pressure sensor detects when said $N_2$ gas supply is defective;

and wherein said pressure sensor detects when said solvent bottle is improperly installed in said pressure tank.

15. The system of claim 14 which further comprises: said system detects $N_2$ leaks in said pressure tank that surrounds said solvent bottle in a Edge Bead removal tool in a spin-on-glass coater.

16. The system of claim 14 wherein said system is embodied in a Edge Bead removal tool in a spin-on-glass coater.

* * * * *